Patented Aug. 6, 1940

2,210,650

UNITED STATES PATENT OFFICE 2,210,650

BASE EXCHANGE MATERIAL

Abraham Sidney Behrman, Chicago, Ill., assignor to International Filter Co., Chicago, Ill., a corporation of Delaware No Drawing. Application June 10, 1938, Serial No. 213,077

4 Claims. (Cl. 23—113)

This invention relates to improvements in base exchange materials and is concerned primarily with the treatment of synthetically prepared base exchange silicates to impart to them enhanced physical and chemical characteristics.

As is now well known in the art of base exchange materials and particularly base exchange silicates, products having high base exchange may be prepared by a variety of methods. Most of the methods in common use at the present time for preparing base exchange silicates depend on the formation of gels or gelatinous precipitates produced by the reaction of solutions containing sodium, aluminum and silica, with the resultant formation of a hydrated sodium aluminum silicate possessing the desired composition. Thus, for example, a reaction mixture is commonly prepared from solutions of sodium silicate and sodium aluminate, or of sodium silicate and aluminum sulfate. Whether a gel or gelatinous precipitate is formed depends upon a variety of factors such as the concentration of the solutions employed, the temperature of mixing, and the inherent nature of the reaction itself. In any case, the gel or gelatinous precipitate resulting from the reaction is suitably processed to produce a finished product of desirable characteristics, the principal steps in such processing comprising drying, washing, granulation and sizing, in any desired sequence.

While it is possible to prepare exchange silicates of high exchange capacity by these methods, and while very desirable materials have thus been prepared and are very extensively and successfully used in the art of water purification, there are some situations in which it is desirable to improve the ruggedness and durability of these materials even at a sacrifice of some of the exchange capacity. Where, for example, the exchange material is to be used under conditions involving exposure to such adverse factors as high temperature or excessive acidity or alkalinity, such increased resistance to these adverse factors will more than compensate for any reasonable loss in capacity.

Specifically, it is common practice to limit the temperature of the water treated with these exchange silicates to 100° Fahrenheit, and to a pH range not higher than about 8.3, and not lower than about 6.8. These limitations automatically preclude the possibility of employing these otherwise very desirable materials for the treatment of water and other liquids for a variety of industrial purposes.

A principal object of my invention is to treat base exchange silicates of the kind described so as to make them much more resistant to the action of the adverse factors just mentioned and thus greatly to increase their utility.

Briefly stated, my invention comprises subjecting base exchange silicates prepared from gels or gelatinous precipitates to the action of steam under pressure, as, for example, in an autoclave. The time, pressure and temperature involved in this treatment may be varied over a considerable range, depending both on the type of material and on the characteristics desired in the finished product. Generally speaking, it will be found that the products thus prepared will possess a somewhat reduced base exchange capacity; and this reduction will usually be greater with increasing time and/or pressure and temperature employed in the treatment. While the conditions of this treatment may be varied greatly, I have found a convenient combination of factors to be a steam pressure of about 30 pounds per square inch and a period of one to four hours. While the atmosphere in an autoclave is usually saturated, I prefer to insure the presence of an excess of water by immersing in water the material being autoclaved, or placing a container of water in the autoclave, or at least soaking the material and draining it before subjecting it to the autoclaving treatment.

It is to be borne in mind that the materials subjected to such autoclaving treatment according to the process of my invention are the gels or gelatinous precipitates which have been dried at some stage in the processing and have acquired substantially their ultimate form and hardness. My invention does not contemplate subjecting such gels or gelatinuous precipitates to elevated temperature and pressure before they have been dried to substantially the final condition in which they would normally be used for water softening or similar purpose.

As an example of the application of the process of my invention to base exchange silicates I will describe its use in the treatment of the material prepared according to my Patent No. 1,930,503. The finished material prepared according to that patent, preferably crushed and screened to the particle size in which it is to be employed, is thoroughly soaked in water and then, after draining, placed in trays or on screens in an autoclave. Where water-tight trays are employed, the material to be autoclaved may be placed on the trays and the trays may be more or less completely filled with water.

When the autoclave has been filled to the desired extent, it is closed and steam is admitted making due provision, of course, for allowing the air originally present in the vessel to escape. A pressure of 30 pounds per square inch is allowed to build up, a reducing valve on the inlet steam line preventing any excess beyond this pressure. After a period of about one and a half hours, the steam supply is cut off and the proper outlet valve on the autoclave is opened. After the autoclave has cooled to the desired temperature the trays containing the autoclaved material are removed and the base exchange silicates are now ready for use, although in some cases it will be found desirable to wash these materials to compensate for any lack of washing in the original processing.

A comparison of the characteristics of the material employed in this example, before and after autoclaving will be of interest. Before autoclaving, the material had an exchange capacity under a given set of test conditions, of about 12,000 grains per cubic foot. After autoclaving, the exchange capacity was about 9,000 grains per cubic foot. When used to soften a water of particularly aggressive character, however, the autoclaved product had an active life over fifty (50%) per cent greater than that of the unautoclaved material; and even greater relative durability was exhibited in an industrial process in which the exchange material was subjected successively to high alkaline and high acid conditions. Quite surprisingly, the change in characteristics noted is not attended by any change in the density of the material itself. In the example given, the bulk density of both the unautoclaved and autoclaved materials was approximately 50 pounds per cubic foot when thoroughly moistened, and 30 pounds per cubic foot on an anhydrous or ignited basis.

While I have described the application of the process of my invention with particular reference to the base exchange silicate obtained from the reaction of solutions of sodium silicate, caustic soda, aluminum sulfate and sulfuric acid in accordance with my Patent No. 1,930,503, my invention is generally applicable to exchange silicates or to those siliceous materials prepared from gels or gelatinous precipitates. Thus, I may mention the siliceous products prepared from sodium silicate and aluminum sulfate according to my U. S. Patent No. 1,515,007 and from sodium silicate, aluminum sulfate, and an acid according to the process of my U. S. Patent No. 1,806,663; or from sodium silicate and sodium aluminate as, for example, according to the patents of Rudorf (1,263,707), Massatch (1,343,927) or Wheaton (1,586,764).

There will naturally be suggested to those skilled in the art numerous modifications in the details of the process of my invention, without departing from the basic principle thereof. All such modifications are contemplated within the scope of my invention as defined by the claims.

I claim:

1. The process for preparing synthetic base exchange silicates which comprises mixing solutions of reactants to form a gelatinous reaction product, drying this gelatinous reaction product to produce a rigid hydrated base exchange gel, and increasing the stability of this hydrated base exchange gel by subjecting it to the action of saturated steam.

2. The process for preparing synthetic base exchange silicates which comprises mixing solutions of reactants to precipitate a gelatinous reaction product, drying this gelatinous reaction product to obtain a rigid hydrated base exchange gel, and increasing the stability of this rigid hydrated base exchange gel by subjecting it to the action of steam in the presence of water.

3. The process for preparing synthetic base exchange silicates which comprises mixing solutions of reactants to form a gelatinous reaction product, drying this gelatinous reaction product to produce a rigid hydrated base exchange gel, and increasing the stability of this hydrated base exchange gel by subjecting it to the action of saturated steam under pressure.

4. The process of preparing synthetic base exchange silicates which comprises mixing solutions of reactants to precipitate a gelatinous reaction product, drying this gelatinous reaction product to obtain a rigid hydrated base exchange gel, and increasing the stability of this rigid hydrated base exchange gel by subjecting it to the action of steam in the presence of water and under pressure.

ABRAHAM SIDNEY BEHRMAN.